United States Patent
Aneja et al.

(10) Patent No.: US 10,834,035 B2
(45) Date of Patent: Nov. 10, 2020

(54) INSTANT MESSAGING FOR MOBILE DEVICE WITH OFFLINE AND ONLINE MODE

(71) Applicants: Sandhya Aneja, Gadong (BN); Nagender Aneja, Gadong (BN); Mohammad Iskandar Petra, Gadong (BN)

(72) Inventors: Sandhya Aneja, Gadong (BN); Nagender Aneja, Gadong (BN); Mohammad Iskandar Petra, Gadong (BN)

(73) Assignee: UNIVERSITI BRUNEI DARUSSALAM, Brunei Darussalam (*) Notice: Subject to any disclaimer, the term of this patent is extended or adjusted under 35 U.S.C. 154(b) by 22 days.

(21) Appl. No.: 16/356,014

(22) Filed: Mar. 18, 2019

(65) Prior Publication Data
US 2020/0304444 A1    Sep. 24, 2020

(51) Int. Cl.
*H04L 12/58* (2006.01)
*H04L 29/06* (2006.01)
*H04L 29/12* (2006.01)

(52) U.S. Cl.
CPC .............. *H04L 51/06* (2013.01); *H04L 51/36* (2013.01); *H04L 51/38* (2013.01); *H04L 61/6022* (2013.01); *H04L 63/0876* (2013.01)

(58) Field of Classification Search
None
See application file for complete search history.

(56) References Cited

U.S. PATENT DOCUMENTS

| | | | | |
|---|---|---|---|---|
| 6,618,593 B1* | 9/2003 | Drutman | ............ | G08B 21/0222 455/456.3 |
| 2008/0056215 A1* | 3/2008 | Kopikare | ............ | H04L 67/303 370/338 |
| 2011/0106719 A1* | 5/2011 | Wang | ............ | H04L 67/18 705/319 |
| 2012/0023171 A1* | 1/2012 | Redmond | ............ | H04W 76/14 709/205 |
| 2012/0238285 A1* | 9/2012 | Yariv | ............ | H04W 4/06 455/456.1 |

(Continued)

*Primary Examiner* — Kenny S Lin

(57) ABSTRACT

The embodiments of the present invention disclose a method and a system for unified instant messaging application/service that enables to concurrently send messages via online mode using internet and Offline or Airplane mode using WI-FI direct service/Bluetooth/WIFI. The instant messaging application first checks the contact to which message is to be sent is in its local vicinity. Once the contact, to whom a message is to be sent is available, and in the local vicinity, the messages are sent by WI-FI direct service/Bluetooth/WIFI without using the internet. If the destination user is not available nearby, then a message is delivered to an internet server or saved to history for delivering the messages to the user when the user is available, or internet is available. The messaging application also allows users to broadcast any question or information to nearby users without being connected or without using the Internet. The instant messaging application also displays different available users on a geographical map with a visual indication. The visual indication allows a user to identify as who has similar interests or different interest.

20 Claims, 9 Drawing Sheets

(56) References Cited

U.S. PATENT DOCUMENTS

| | | | | |
|---|---|---|---|---|
| 2012/0271883 | A1* | 10/2012 | Montoya | H04W 4/029 |
| | | | | 709/204 |
| 2013/0091288 | A1* | 4/2013 | Shalunov | H04W 8/005 |
| | | | | 709/227 |
| 2016/0099963 | A1* | 4/2016 | Mahaffey | H04L 63/0227 |
| | | | | 726/25 |
| 2016/0316503 | A1* | 10/2016 | Raphael | H04W 4/80 |
| 2017/0013401 | A1* | 1/2017 | Jonsson | H04W 4/023 |
| 2018/0278728 | A1* | 9/2018 | Kongovi | H04L 69/24 |
| 2018/0337928 | A1* | 11/2018 | Pelletier | H04W 12/10 |
| 2019/0043137 | A1* | 2/2019 | Mathis | H04L 51/32 |
| 2020/0175612 | A1* | 6/2020 | Montoya | G06Q 50/01 |

* cited by examiner

| Phone Number | Mac Address |
|---|---|
| 673 872 1817 | 02:00:06:90 |

FIG. 8

INSTANT MESSAGING FOR MOBILE DEVICE WITH OFFLINE AND ONLINE MODE

RELATED APPLICATION

This application claims the benefit of Brunei Application No. BN/N/2018/0026 filed on Mar. 19, 2018 and entitled "Instant Messaging for mobile device with offline and online mode", the content of which is incorporated in its entirety herein by reference.

FIELD OF THE INVENTION

The invention is directed to systems and methods for sending messages to a proximity user or to a user who can be connected by one or more intermediate nodes whether the internet connection (online) is available or not available (off-line).

BACKGROUND

The instant messaging (IM) is a collection of technologies used for real-time communication between two or more participants over the network. The instant messaging (IM) enables real-time direct communication between two or more people using personal computers or other devices, along with shared software clients. Currently, it has become the most famous feature of any smartphone device. Today people around the world want to take the things to instant messenger. Even people prefer nowadays instant messenger for not only to share text messages but also pictures, videos, web cam chat, documents, location, etc.

In some contexts, IM may be recognized under the umbrella term online communication, as it includes the capability to provide a real-time networked communication system based on device client applications and network services that facilitate communication connections between specified known users. Known users, or simply contacts or one or more entries from a contact list, comprise, for example, a Buddy List, a Friend List, and a Contact List. IM can comprise web-based applications that allow communication between users in a multi-user environment.

Existing instant messenger always requires an internet connection to get the people connected. It has been observed that the many places including but not limited to remote areas, emergency situations, non-availability of power, airplane space does not allow to take the advantage of internet due to non-availability or high cost. When a team or group is traveling from a flight for a long duration, they face difficulty in conversation and to get connected to each other. Hence, there is always a requirement of an online and offline mode for the smartphone or tablet.

There are several innovations had occurred. For example, IM specific to school scenario has been developed where students can exchange messages using Bluetooth without using the internet and save data while in school. However, it has a drawback to not to support the exchange of messages when the Internet is available automatically, or the destination user is not available nearby. In another example, a system facilitates chatting while in airplane scenario using Bluetooth. Even exchanging the communication through Bluetooth may be slow for large files and is a short-distance communication. In another example, none of the system talks about switching online and offline mode depending on the requirement or user preferences. Also, none of the messenger provides profile matching before communication. Allowing a user to accept or reject connection based on matched profile, users interests, or any prior information available before connection.

Therefore, there is a need of messenger which solves the problem of data saving when the friend whom a user wants to chat is nearby or at a distance so that can be connected via other intermediate nodes.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter. The term "techniques," for instance, may refer to a device(s), a system(s), method(s) and computer-readable instructions as permitted by the context above and throughout the document.

Examples of the disclosure describe unified instant massaging methods and systems. The invention is explained in different embodiments that can be combined in different forms for better user experience. The methods and systems first check the contact to which message is to send in its local vicinity. Once the contact, to whom a message is to be sent is in proximity, then the instant message is sent directly or using intermediate mobile devices by WI-FI direct service, Bluetooth, or WIFI without using the internet but without using any centralized infrastructure and is saved in browsing history to sync with the cloud. If the destination user is not available nearby, then the message is delivered to Internet Server or saved to history and delivered to destination user when either destination user is available or Internet is available.

BRIEF DESCRIPTION OF THE DRAWINGS

The present invention will now be described with reference to the accompanying Figures, in which:

FIG. 8 depicts an exemplary binding table in which phone numbers in a contact list on the user computing device are bound with the MAC address.

DETAILED DESCRIPTION

Figure 1:
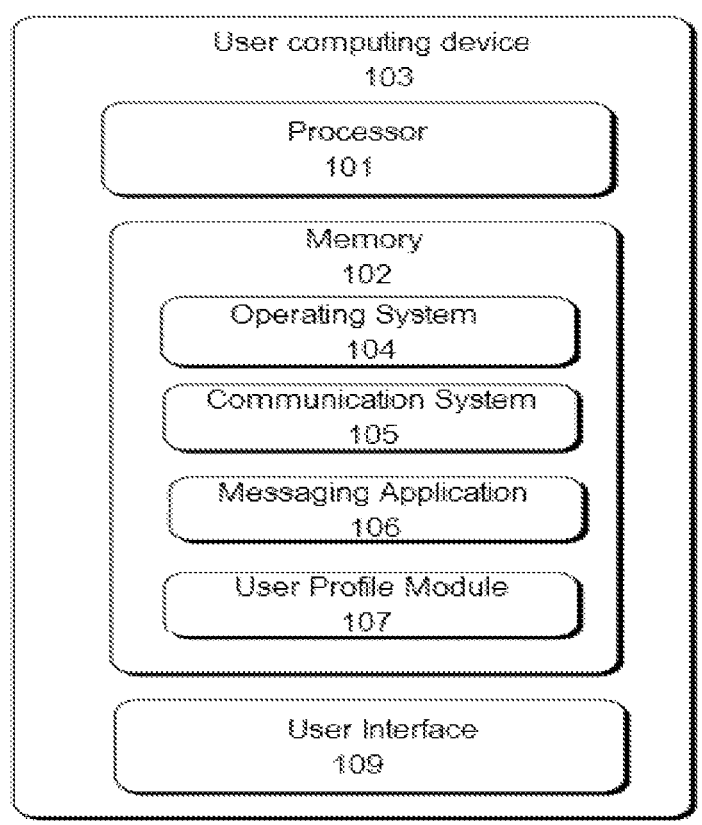
FIG. 1 is an exemplary block diagram illustrating a user computing device with instant messaging capabilities.

The invention is advantageous in that it provides an instant messaging application for real-time communication between two or more participants offline or online based on their proximity. The main benefit of the invention is that it saves the user data usage if contact to whom a message is to be sent is present in a nearby location and thus message can be sent by WIFI direct or Bluetooth without using the data service or any centralized fixed infrastructure.

There are multiple scenarios where the present invention is beneficial. For examples, using the invention, a traveler can find a co-traveler for sharing a taxi to a particular destination. The conference attendees can find another researcher for sightseeing after the conference. The researchers can find a location of the rooms for the session to attend among parallel tracks going on. The children can use the invention to play networking based multiplayer games during waiting time or inside long flight. The sick persons can consult or have some medicines in the airplane. A teacher can share some files, when the Internet connection is not available/feasible. The invention is advantageous in scenarios where a user does not want to reveal his/her details, however, need some urgent information on humanity grounds. The soldiers can communicate during training in remote areas where the data connection/internet is not available. The people can communicate during disaster or emergency situation when infrastructure is not available. The international traveler can save internet data while sharing pictures among family members nearby. The digital name card can be distributed to nearby or distant users.

The invention enables to automatically compute attendance and provide notification on user mobile device or administration in case of emergency. The instant messaging application also displays different users on the geographical map with a visual indication about availability status. The visual indication also allows a user to identify as who has similar interests or different interest. The instant messaging application also allows users to broadcast any question or information to nearby users without being connected or without using the Internet. The messaging application further allows sending of messages to a user via other users without being connected and without using the Internet.

While illustrative embodiments have been illustrated and described, it will be appreciated that various changes can be made therein without departing from the spirit and scope of the invention.

According to one embodiment, a method comprises receiving an input at a first computing device for sending the message to a second computing device. A contact list on the first computing device is scanned to identify an identifier/MAC address associated with the second computing device. The mobile numbers in the contact list are bound with the MAC address in a binding table. The proximity of the second computing device to the first computing device is determined based on the identifier, and the message is sent to the second computing device using one of two different modes of communication-based on the determination.

According to another embodiment, a computing device comprising at least one processor, and at least one memory including computer program code for one or more computer programs, the at least one memory and the computer program code configured to, with the at least one processor, cause, at least in part, the computing device to receive an input for sending a message to a second computing device, scan a list on the first computing device to identify an identifier associated with the second computing device, determine the proximity of the second computing device to the first computing device, and send the message to the second computing device based on the identification and the determination.

According to another embodiment, a computer-readable storage medium carrying one or more sequences of one or more instructions which, when executed by one or more processors, cause, at least in part, the computing device to broadcast periodically name and dynamic interests of a user associated with a computing device to one or more nearby available computing devices without disclosing personal information of the user and without getting connected, receive a notification based on the matching of the dynamic interests of the user associated with the computing device with interests of one of the one or more nearby available computing devices, wherein notification are received when the matching is more than a predefined value, send a request to establish a connection with the one of the one or more available nearby computing devices after receiving the notification, receive an acceptance of the request from the one of the one or more nearby available computing devices, and send a message to the one of the one or more nearby available computing devices.

According to another embodiment, a computing device comprises means for receiving an input for sending a message to a second computing device, scanning a list on the first computing device to identify an identifier associated with the second computing device, determining the proximity of the second computing device to the first computing device, and sending the message to the second computing device based on the identification and the determination.

FIG. 1 shows relevant components of a user computing device 103 in accordance with an example embodiment. The user computing device 103 represents any device executing instructions (e.g., as application programs, operating system functionality, or both) to implement the operations and functionality described herein. The computing device may include a mobile computing device or any other portable device associated with a user. In some examples, the computing device includes a mobile telephone, laptop, desktop computer, tablet, and computing pad.

In this illustrative case, the user computing device 103 may include a processor 101, a memory 102, and a user interface 109. The processor 101 includes any quantity of processing units and is programmed to execute computer-executable instructions for implementing aspects of the disclosure. The instructions may be performed by the processor or by multiple processors executing within the computing device, or performed by a processor external to the computing device. In some examples, the processor is programmed to execute instructions such as those illustrated in the figures.

Memory 102 may comprise a variety of computer-readable storage media. Such media can be any available media including volatile and non-volatile storage media, removable and non-removable media, local media, remote media, optical memory, magnetic memory, electronic memory, etc. The memory 102 stores, among other data, one or more applications, and the image data. The applications, when executed by the processor 101, operate to perform functionality on the computing device. Exemplary applications include at least an instant messaging application 106 for sending instant messages to other devices online or offline.

The applications may communicate with counterpart applications or services such as web services accessible via a network. For example, the applications may represent downloaded client-side applications that communicate with server-side services executing in the cloud.

The memory 102 further includes computer-readable instructions that are accessible and executable by processor 101 to implement the functionality of instant messaging application described herein. In some embodiments, the instructions may comprise an operating system 104, a communication system 105, and a user profile module 107. A user of mobile device 103 can interact with these elements through user interface 109, which might be formed by a display screen and associated keypad, with a touch-sensitive display screen, or other means.

Communication system 105 can be part of the operating system 104 and may implement standard wireless communication protocols such as those defined by the previously mentioned IEEE 802.11 standard. The computing device may communicate with another device via a network. Exemplary networks include wired and wireless networks. Exemplary wireless networks include one or more of wireless fidelity (Wi-Fi) networks, BLUETOOTH brand networks, cellular networks, and satellite networks, Wi-Fi Direct, Mesh Network. In some examples, the other device is remote from the computing device. In other examples, the other device is local to the computing device.

The computing device constitutes other means (not shown) for performing one or more steps of sending online or offline messages to nearby users or distance users based on their proximity to the sending device. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of a processor(s), including a digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and it's (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU), a Digital Signal Processor (DSP), and a receiver/transmitter unit including a microphone gain control unit and a speaker gain control unit. The main display unit provides a display to the user in support of various applications and mobile terminal functions that perform or support the steps of providing an audio token-based payment system. The display includes display circuitry configured to display at least a portion of a user interface of the mobile terminal (e.g., mobile telephone). Additionally, the display and display circuitry are configured to facilitate user control of at least some functions of the mobile terminal. An audio function circuitry includes a microphone and microphone amplifier that amplifies the speech signal output from the microphone. The amplified speech signal output from the microphone is fed to a coder/decoder (CODEC).

A radio section amplifies power and converts frequency to communicate with a base station, which is included in a mobile communication system, via antenna. The power amplifier (PA) and the transmitter/modulation circuitry are operationally responsive to the MCU, with an output from the PA coupled to the duplexer or circulator or antenna switch, as known in the art. The PA also couples with a battery interface and power control unit.

The instant messaging application 106 works in conjunction with different communications systems 105 to receive and/or send messages from nearby or distant users based on their proximity to the user computing device 103, as described herein.

The user profile module 107 automatically creates and maintains a profile of the user based on users browsing history at different GPS locations or other user actions performed by users on the mobile device. In one of the exemplary embodiment, the user profile module 107 can be manually configured by the user and allows the user to manually enter the profile information with the help of keywords or images.

The messaging application 106 includes a profile similarity module. The messaging application 106 uses the profile similarity module to display all available users, whether locally or on the Internet, on a map with the different visual indication. The different visual indication represents different profile similarity. The users with the similar profile are indicated, for example, with green color, and the users with different interest are indicated, for example, with yellow color.

The profile similarity module computes the profile similarity by Piecewise Maximal Similarity that is equal to similarity $$(A, B) = \frac{\Sigma \min(wA_i, wB_i)}{(\Sigma wA_i + \Sigma wB_i)/2},$$

where Profile of A is (wA1, wA2, . . . , wAn) and profile of user B is (wB1, wB2, . . . , wBn). In another embodiment, profile similarity module can also use other profile similarity methods, for example, cosine similarity, to compute profile similarity.

Based on the similarity of profiles, the user may select another user to communicate offline. For example, in an embodiment, when the similarity between the profile of the user and another nearby user is higher than a preconfigured threshold value, a notification is provided to the user that the nearby user has a similar profile. If the similarity between the profile of the user and the nearby user is higher than a preconfigured threshold value or otherwise and if the nearby user can be connected using single hop or multiple hops offline without using the Internet, a notification is sent. The messaging application 106 allows the user to configure the preconfigured threshold value. In one of the exemplary embodiment, the user is notified if another nearby user having the similar profile is interested in playing networking games without using the Internet.

Figure 2:
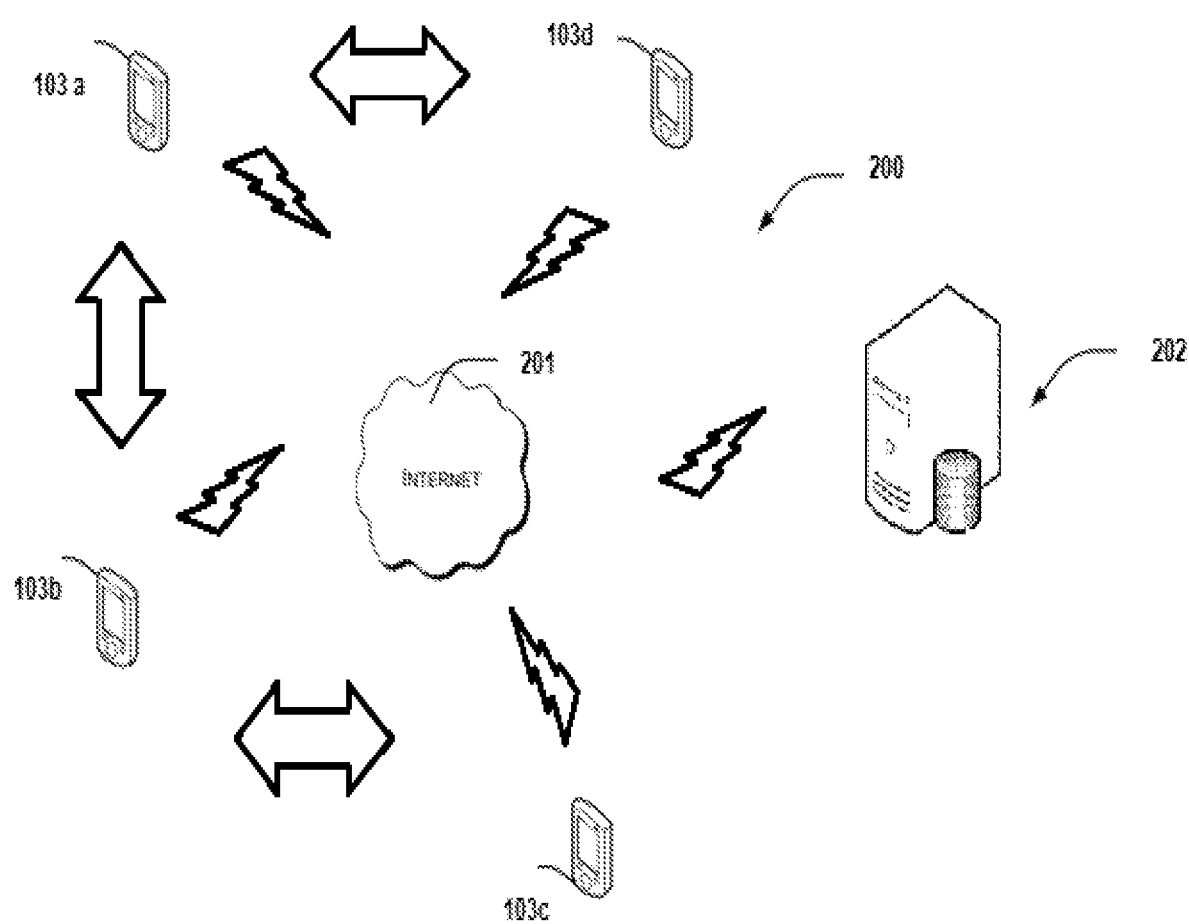
FIG. 2 is an exemplary block diagram illustrating a system for facilitating instant messaging between a first computing device and a second computing device.

Referring to FIG. 2, an exemplary block diagram illustrates a system 200 in which the computing devices exchanges instant messages online or offline with each other using the instant messaging application installed on their devices. FIG. 2 shows that a plurality of computing devices 103a-103d can communicate with each other through the Internet where they are remote. The plurality of computing devices 103a-103d can also communicate to an instant messaging server 202 through the Internet for downloading the instant messaging application and registration of the computing device with the instant messaging server. The plurality of computing devices 103a-103d can also communicate directly or via intermediate computing devices in offline mode without using the internet when they are nearby.

Figure 3:
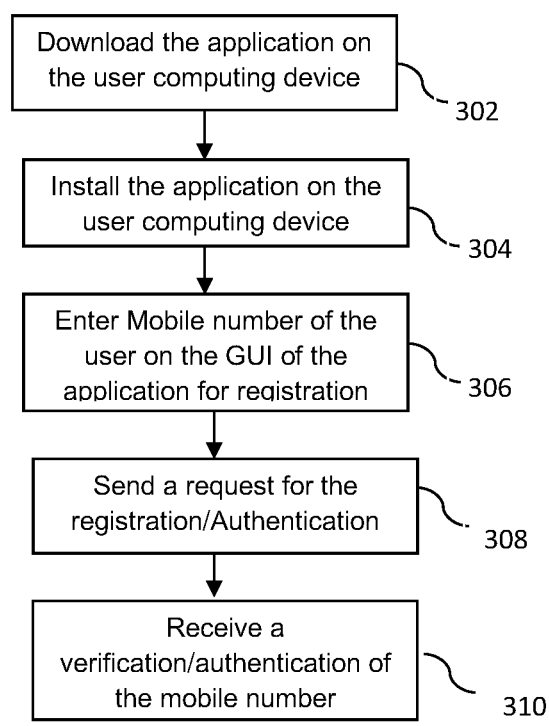
FIG. 3 is an exemplary flowchart for installation, registration, and authentication of an instant messaging application with a mobile number of a user computing device.

FIG. 3 provides an exemplary flowchart for installation, registration, and authentication of the instant messaging application 106 with a mobile number of the user computing device 103. In step 302, a user downloads the instant messaging application (app) 106 from the Play Store, iTunes, or a Centralized repository and installs it on a user computing device 103 at step 304. After the installation, a graphical user interface (GUI) is displayed for registration of a mobile number of the user with the instant messaging server 202 associated with the instant messaging application 106.

The user enters the mobile number in the GUI of the instant messaging application 106 at 306 for registration and sends a request for registration at step 308 of the mobile number with the instant messaging server 202. The user waits for authentication of the mobile number and the user computing device 103 after sending the request. The mobile number is the number to be authenticated on the same instant messaging application 106 on the same user computing device 103 from which a request of registration/authentication is sent (different from OTP that is sent to SIM which may be in any other device). In one embodiment, the mobile number to be authenticated is configured on the same user computing device 103 where the instant messaging application 106 has been installed. In another embodiment, the request of authentication is sent from the same user computing device 103 where both mobile number and the instant messaging application 106 are configured. The user computing device 103 receives a response to the request at step 310. The registration process verifies and authenticates that the instant messaging application 106 and the mobile number are configured on the same user computing device 103.

In one embodiment, once the authentication has been performed, the instant messaging server 202 reads MAC Address of the authenticated device and contact list along with their MAC addresses if available. In an embodiment, the MAC addresses of some of the contacts may be available in the prior history.

In one of the embodiments, the user computing device 103 is first registered to the instant messaging server 202, and its mobile number, contact list, and personal details are shared with the instant messaging server 202. In another embodiment, the mobile number, contact list in the user computing device 103, and personal details are sent to the instant messaging server 202 in the registration request. This information is authenticated by sending a token to the user computing device 103. In one of the embodiments, while authentication, the user computing device's MAC address is also sent along with the token.

There may arise different possibilities depending on contacts in contact list may or may not be using the same instant messaging application 106 and instant messaging service (IMS) provided by the instant messaging server 202. In one embodiment, the contacts in the contact list use the same IMS. In this scenario, for all contacts in the contact list, MAC address will be available on the server 202. While completion of registration, in an embodiment the instant messaging server 202 synchronizes a binding table of MAC addresses and phone numbers associated with the contact list at the user computing device 103.

In another embodiment, the contacts in contact lists are not using the same IMS. In this scenario, for all contacts, MAC addresses may not be available. In this scenario, while registration, server creates a binding table like in earlier case but may not contain the whole binding for contact list. In that case, whenever a user comes in a range of other devices, it learns MAC addresses of other computing devices and notifies user to enter respective user's phone number corresponding to the MAC address for slowly populating the binding table. In another embodiment, the instant messaging application 106 of the user computing device automatically populates the binding table with MAC addresses as a contact comes nearby the user computing device 103. In another embodiment, a unique identifier associated with the device is used instead of MAC Address.

Figure 4:
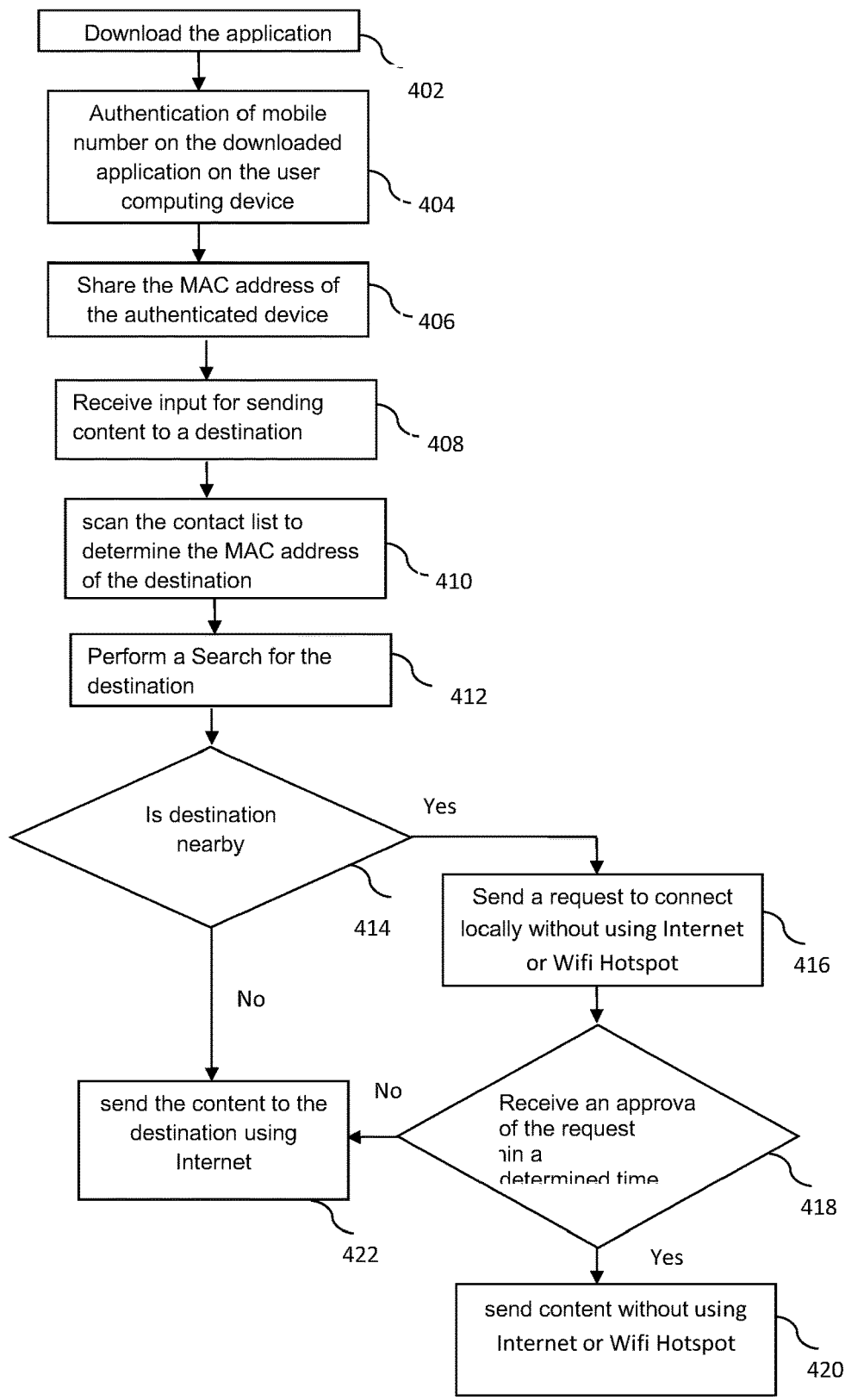
FIG. 4 provides an exemplary flowchart for connecting to a first user computing device and sending the content/message to a second computing device using the instant messaging application.

FIG. 4 provides an exemplary flowchart for connecting to a first user computing device 103a and sending the content/message to a second computing device 103b using the instant messaging application 106. In step 402, a user at the first user computing device 103a downloads the instant messaging application 106 from the Play Store, iTunes, or a Centralized repository and installs it on the first computing device 103a. It is assumed that the second computing device 103b has already installed the instant messaging application and is registered with the instant messaging server 202. After the installation, a graphical user interface (GUI) is displayed for registration of the mobile number of the first user computing device 103a with the instant messaging server 202 associated with the instant messaging application 106.

The user enters the mobile number in the GUI of the instant messaging application 106 for registration and sends a request for registration of the mobile number with the instant messaging server 202 at step 404. The user waits for authentication of the mobile device after sending the request. The mobile number is the number to be authenticated on the same app 106 on the same device from which a request of registration/authentication is sent (different from OTP that is sent to sim which may be in any other device).

The first user computing device 103a receives a response to the request at 406. The registration process verifies and authenticates that messaging application 106 and mobile number are configured on the same first user computing device 103a. Once authenticated, the first user computing device 103a sends the MAC address of the authenticated device and/or contact list along with their MAC addresses if available to the instant messaging server 202. In one of the embodiment, after authentication, the server 202 reads MAC Address of the authenticated device and contact list along with their MAC addresses if available from the first user computing device 103a. In an embodiment, the MAC addresses of some of the contacts may be available in case of prior history, and the server 202 reads the MAC addresses of some of the contacts from the prior history.

At step 408, the user enters content/message in a GUI of the instant messaging application 106 for sending to a destination/second user computing device 103b. The content/message is at least one of the text message, file, name card, promotion material, picture, audio, video, etc. In an embodiment, the content can be a question that a source wants to ask or broadcast to other users nearby without knowing any personal information of other users, digital name card, an invitation, information, interests, etc. The questions may be posted using interests because using interests nearby contact may accept or reject to chat.

The user clicks a send button in the GUI to send the content/message. In response to clicking the send button, the instant messaging application 106 at step 410 scans the contact list on the first user computing device to see if there is already a bound MAC address in the contact list for the destination/second user computing device 103b or the user can be connected by one or more hops without using a centralized infrastructure. The MAC Address of the destination/second user computing device 103b is bound in the contact list on approval by the/second user computing device 103b. At step 412, the first user computing device 103a perform a search on determining that the MAC address of the destination is already bound in the contact list and whether the destination/second user computing device 103b is nearby. At step 414, it is determined whether the destination/second computing device 103b is nearby and then in response to a determination that the destination/second user computing device 103b is nearby, a request is sent to the destination/second user computing device 103b at step 416 to connect locally without using internet or Wifi Hotspot at step 416. In another embodiment, the request to connect is based on the identifier associated with the first user computing device 103a.

The first user computing device 103a waits for approval of the request for a predetermined interval of time (e.g., preferably up to 30 seconds). On receiving the approval at step 418 within, the content/message is sent to the destination/second user computing device 103b at step 420. When local contact request is not approved, or the destination is not available locally, then the content is sent to a server for further sending the content to the destination using the Internet at step 422.

In one of the embodiment, the contact list of a first computing device is synced with newly bound MAC address when the device accesses the Internet. In an embodiment, the history of the content exchanged with different users is synced with the server or with personal cloud when the computing device accesses the Internet.

One of the main objectives of the invention is to solve the problem of data saving when a friend whom a user wants to chat is nearby or can be connected by one or more intermediate nodes, and still heavy data service may be used to exchange audio/video messages.

Figure 5:
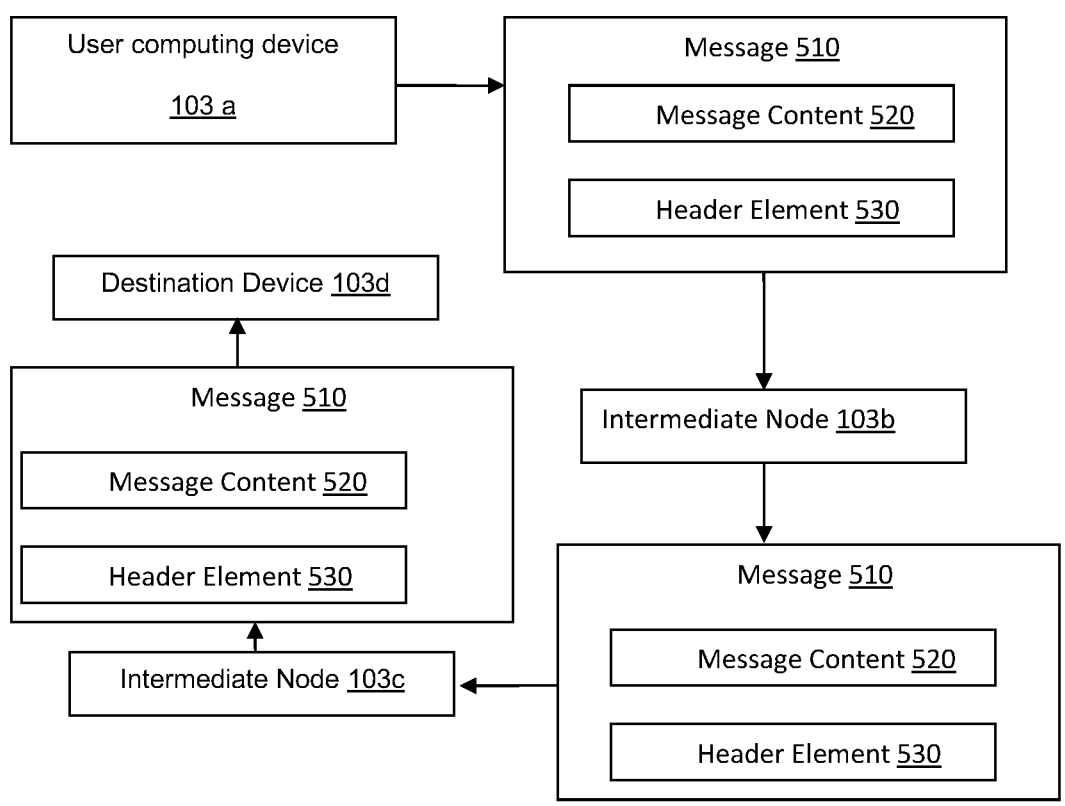
FIG. 5 is a block diagram illustrating a system for sending instant messages to a destination device using intermediate nodes.

FIG. 5 is a block diagram illustrating a system for sending instant messages to a destination device using intermediate nodes. The system 500 may include the user computing device 103a, one or more intermediate nodes 103b, 103c, and a destination device 103d. The user computing device 103a may broadcast a message 510 that is received by a nearby intermediate node 103b without using the Internet. The nearby intermediate node 103b is a device whose MAC address is either bound in the contact list of the user computing device 103a or not bounded. The message 410 may include message content 520 and a header element 530 which includes the destination MAC address or a unique identifier of the destination device 103d. The intermediate nodes 103b may receive the message 510 and forwards the received message 510 to the destination device 103d. The nearby intermediate node 103b determines if the destination device 103d is nearby whose MAC address is embedded in the message. On determining that the destination device 103d is nearby, then the nearby intermediate node 103b forwards the message 510 to the destination device 103d. In case the destination device 103d is not nearby, the intermediate node 103b forwards the message 510 to another nearby intermediate node 103c for forwarding the message to the destination device 103d. In this way, the message 510 is sent to the destination device 103d without using the Internet.

In one of the embodiment, the messaging application 106 provides profile matching at current GPS location depending on user interests which allows a user to decide to initiate a chat or not and receive and/or send notifications generated based on profile matched in some nearby location. Further, for example, people with similar interest may decide to chat with using offline online mode or online offline mode. The messaging application 106 displays users on the map with different visual indication based on matched interest. In an example, similar users may be shown in green color, and different interests may be shown in yellow color.

In one of the embodiments, the profile similarity/matching is computed by Piecewise Maximal Similarity technique that is equal to similarity $$(A, B) = \frac{\Sigma \min(wA_i, wB_i)}{(\Sigma wA_i + \Sigma wB_i)/2},$$

where Profile of A is (wA1, wA2, . . . , wAn) and profile of user B is (wB1, wB2, . . . , wBn). The user may select another user with which profile is matched and has similarity higher than the preconfigured threshold. The user is also notified if a similar user having higher than a preconfigured threshold is nearby so that the similar user can be contacted without the Internet.

The phone numbers of users in the contact list are bound with MAC address and which further helps to decide to chat with using and automated switching between a first mode to a second mode. The different modes are online mode and offline mode. In one of the exemplary embodiments, the invention enables to locate and display information about nearby users. The MAC address table on the user computing device 103 and the instant messaging server are used for all registered users with their details. The nearby devices are first located, and then a query is sent to the server to retrieve about personal details of the contact from the server using received MAC address. It does not switch to online and offline line mode for chatting to save the data.

The availability of internet or data connection is not a constraint or limitation for exchanging the messages. For example, the messages can be exchanged when Internet connection (online) is available and when the Internet connection is not available (off-line). The messaging application enables to first check the contact to whom the message is to be sent in its local vicinity. In case, contact is in the local vicinity, it uses peer-to-peer networking or mesh networking for exchanging the messages otherwise it sends a message through the Internet. It is data friendly since when a friend (contact) is available nearby, it uses an off-line connection. Based on the availability of the communication technology, the messaging application allows exchanging messages in the near region in an area equivalent to a range of communication technology used.

In an exemplary embodiment, a telecommunication infrastructure is used for chatting offline and online mode. Whenever the user is offline then chatting is enabled using SMS service or email service. In another example, a messenger may be used which is another way of wireless communication however, it does not switch between offline and online system.

The messaging application 106 enables users to broadcast name and dynamic interests in the air without disclosing any personal information and getting connected. In an exemplary embodiment, a user is looking for sharing taxi without disclosing the mobile number, personal information and without getting connected. Nearby users will see the interest broadcasted and helps them to decide whether he/she wants to connect or not. In another example, the users may send and receive invites for a new chat or may cancel the chat anytime. This feature provides artificial intelligence for notifying the user that its interests are matched to some nearby user.

In peer-to-peer networking, the connection between the nearby devices is established using handshaking protocols. The peer-to-peer networking based protocols enable all devices to receive the periodically broadcasted MAC Addresses to nearby devices. In an embodiment, MAC Address is renamed with username and interests so that other users can receive name and interests without being connected. The user computing device receives MAC addresses of the nearby devices and stores MAC addresses received in the memory. Out of all available devices to which a device wants to connect, it sends a request and once accepted by a receiver, notifies to the sender. On receiving the notification, two devices are connected and may communicate within range.

In an embodiment, a table is maintained at a user computing device and on the instant messaging server which binds available phone numbers and/or their names, etc. in the contact list with their MAC addresses. When the user computing device is first registered to the instant messaging server, it is required to provide its phone number, contact list or personal detail to the instant messaging server. This information is authenticated using a token sent to that user computing device. In an embodiment, during the confirmation, MAC addresses of the contacts in the contact list are also sent to the user computing device. In one of the embodiments, when all the contacts in the contact list are using the IMS, then for all contacts in a contact list, MAC addresses will be available on the server. During the completion of registration, the instant server synchronizes the binding table of MAC addresses and phone numbers at a client.

In another embodiment, the contacts in contact lists are not using the same IMS or instant messaging application. In this case, for all contacts MAC addresses may not be available. In this scenario, while registration, server creates a table at the user computing device which does not contain the whole binding for contact list. The user computing device learns the new or missing MAC addresses whenever the user computing device comes in a range of other devices using any communication technology. The new or missing MAC addresses are automatically populated in the binding table or the user receives a notification for entering respective user's phone number for slowly populating the binding table.

In another embodiment, the binding table or contact list associated with the user computing device is also stored at the instant messaging server and is periodically updated based on other registered users accessing the instant messaging server without disclosing confidential information. The binding table at the user computing device is synced with the newly bound address periodically when the device accesses the Internet. In another embodiment, the instant messaging server and/or the user computing device stores the content exchanged with different users. The history of the content exchanged with different users is synced with the server or personal cloud when the user computing device 103 accesses the internet.

Figure 6:
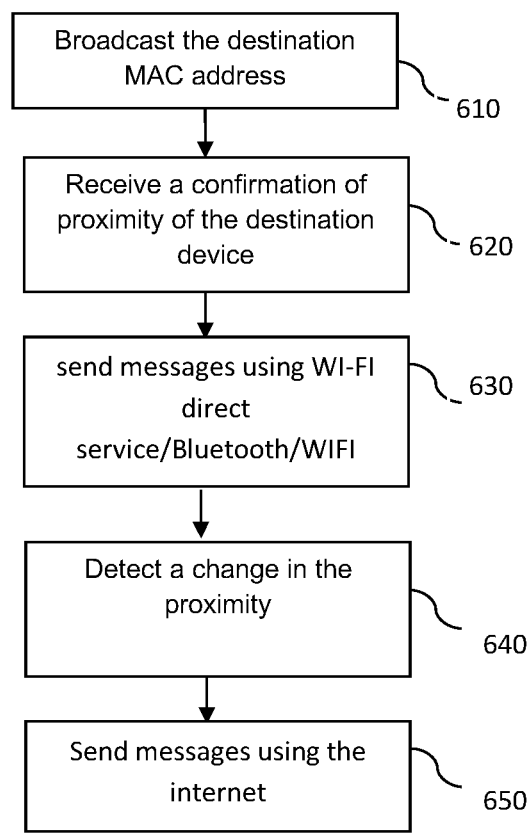
FIG. 6 is a flowchart illustrating a method according to an embodiment of the invention for switching instant messaging from online mode to offline mode or vice versa based on the proximity of two communicating devices.

FIG. 6 is a flowchart illustrating a method according to an embodiment of the invention for switching instant messaging from online mode to offline mode or vice versa based on the proximity of two communicating devices. The method illustrated in FIG. 6 is inclusive of acts that may be taken by an operating environment executing an exemplary embodiment of the invention.

The method begins when a system running an IM application 106 detects a change in the proximity of other computing device. As detailed above, the change in proximity may be determined using passive or active proximity detection systems, such as RFID, ultrasonic, infrared, or Bluetooth proximity detection systems. The embodiments of the invention are not limited to a particular proximity detection mechanism.

In one of the exemplary embodiment, the proximity of a contact is determined by the messaging application 106 before sending messages. The messaging application 106 broadcasts a contact's MAC address or unique identifier in local range at 610. Once the contact, to whom the message is to be sent is available which is confirmed if MAC address table of contacts is refreshed with replies at its current GPS location at 620. The user computing device sends the message to the destination using the WiFi direct or Bluetooth at 630.

The user computing device detects a change in proximity of the destination computing device at 640 wherein the detection is performed periodically. Upon detecting a change in proximity, the system may change the network used for communication. For example, if the proximity detection system determines that the other computing device is no longer in proximity, the messages are sent through the Internet at step 650. Similarly, if the proximity detection system further determines that another computing device has returned in proximity to the sending device, the user computing device switches off the data connection and send instant message by WI-FI direct service/Bluetooth/WIFI.

Based on the switching, the data usage is saved if contact to whom the message is to be sent is present in a nearby location and thus message can be sent by WIFI direct or Bluetooth without using data service. In another embodiment, if the sending device was initially sending the messages by WI-FI direct service/Bluetooth/WIFI but the contact changes its location and is then moves out from a predefined range. The sending device confirms that the contact, to whom the message is to be sent is now not nearby using the MAC address binding table of contacts. The MAC address binding table is refreshed and updated with replies from the contact when it is not in current GPS location of the sending device. The sending device then switches off the WI-FI direct service/Bluetooth/WIFI connection and starts sending messages using the Internet. In one the embodiment, the transition from offline to online or vice versa is such a smooth that the connection is not disconnected and the user is not able to realize the transition.

Figure 7:
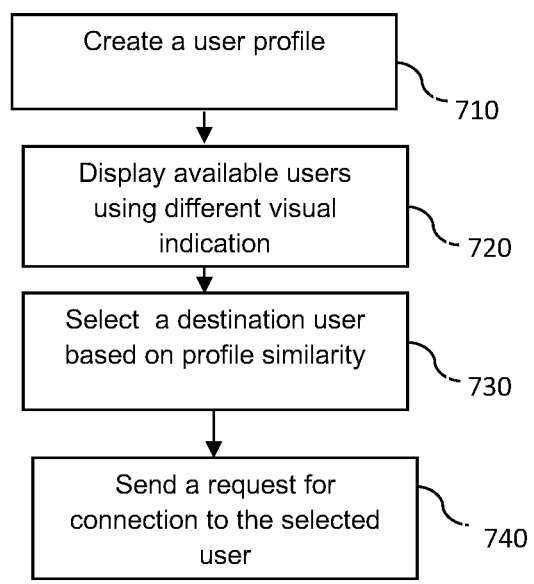
FIG. 7 is a flowchart for illustrating a method according to an embodiment of the invention for selecting/identifying a suitable user for establishing the connection at current GPS location based on the profile similarity.

FIG. 7 is a flowchart illustrating a method according to an embodiment of the invention for selecting/identifying a suitable user for establishing the connection at current GPS location based on the profile similarity. The method allows a user to decide to initiate a chat or not based on a matching of the profiles. Further, the method enables a user to find like-interest people in real time scenario and helps to decide to chat with them using offline online mode or online mode.

At 710, a profile of a user is created with dynamic interests. The profile of the user may be created based on the browsing history or other user actions. As another example, the profile of the user is manually configured by the user. At 720, the messaging application 106 displays all the available users whether on the Internet or local, on a map with the different visual indication. The different visual indication represents different profile similarity of the users who are available locally or on the Internet. In an embodiment, users with green color are the users with profile similarity greater than a predefined threshold value and users with yellow color are the users with different interest/profile with profile similarity less than the predefined value. In an embodiment, the predefined threshold value is configured by the user.

The profile similarity is computed by Piecewise Maximal Similarity that is equal to similarity $$(A, B) = \frac{\Sigma \min(wA_i, wB_i)}{(\Sigma wA_i + \Sigma wB_i)/2},$$

where Profile of A is (wA1, wA2, . . . , wAn) and profile of user B is (wB1, wB2, . . . , wBn).

At 730, a user selects another user with which profile is matched higher than a predefined threshold value. In one of the embodiment, the user is notified if another user having profile similarity higher than the predefined threshold value is nearby, so that another user can be contacted without the Internet. As an example, based on a matching of the profile or interest, the user is notified if another user is interested in playing networking games without using the Internet.

FIG. 8 depicts an exemplary binding table in which phone numbers in a contact list on the user computing device are bound with the MAC address. The table helps the user to decide to chat or not with another user, chat using offline online mode or online offline mode and enables automated switching between online mode and offline mode.

Figure 9:
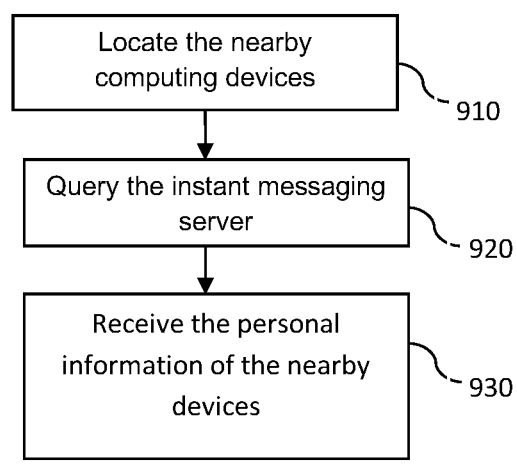
FIG. 9 depicts an exemplary flowchart for displaying personal information of the nearby users on user computing device using the instant messaging application.

FIG. 9 depicts an exemplary flowchart for displaying information of the nearby users. At 910, the user computing device uses the binding table to locate the nearby users. At 920, the user computing device queries the server using the MAC addresses of the nearby devices. At 930, the user computing device receives and displays the personal details of the nearby users who have registered with the server.

In one of the embodiment, the messaging application 106 uses a telecommunication infrastructure for chatting in offline and online mode. For example, whenever the user is offline, then using SMS service or email service chatting may be enabled. The messaging application 106 displays a user interface, where a user can select a telecommunication service for sending the message. When the user enters the message in the user interface and send button is clicked, the message is sent via the selected telecommunication service.

In an exemplary embodiment, the offline mode of exchanging the messages has higher priority than an online mode of exchanging messages. It is first determined that the contact to whom a message is to be sent in its local vicinity. In case, contact is in the local vicinity, a peer-to-peer networking or mesh networking is used for exchanging the messages in offline mode otherwise the messages are exchanged through the Internet. Thus, the offline mode of sending the messages using the Internet has higher priority over the sending the messages using the online mode. It is data friendly since when a friend (contact) is available nearby, it uses an offline connection. As per the communication technology available, it may be used in the near region in an area equivalent to a range of communication technology used.

The peer-to-peer networking connects nearby devices using handshaking protocols. In the peer-to-peer networking, all devices receive the MAC addresses periodically broadcasted by nearby devices. In an embodiment, MAC addresses are renamed with username and interests so that other users can receive name and interests without being connected. The devices maintain a table for all received MAC addresses or username and interests. Based on the received name and interests, out of all available devices to which a device wants to connect, it sends a request for establishing a connection. On receiving an acceptance of the request by a receiver, a connection is established between sender and receiver and then two connected devices may communicate within range.

As an example of peer-to-peer networking, the messaging application 106 enables the users to broadcast name and dynamic interests in the air without disclosing any personal information and getting connected. For example, a user looks for sharing a taxi. The nearby users will see the interest broadcasted and decide for connection based on the broadcasted information. The messaging application 106 allows users to send and receive invites for a new chat or may cancel the chat anytime. The artificial intelligence of the messaging application 106 notifies the user that its interests are matched to some nearby user.

In an exemplary embodiment, the messages can be sent by using online mode and offline or airplane mode concurrently. The messaging application 106 enables to send the messages to nearby devices using an offline mode without using the Internet and to remote devices using internet concurrently.

Exemplary computer readable media include flash memory drives, digital versatile discs (DVDs), compact discs (CDs), floppy disks, and tape cassettes. By way of example and not limitation, computer-readable media comprise computer storage media and communication media. Computer storage media includes volatile and nonvolatile, removable and non-removable media implemented in any method or technology for storage of information such as computer-readable instructions, data structures, program modules or other data. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or other data in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like. Such systems or devices may accept input from the user in any way, including from input devices such as a keyboard or pointing device, via gesture input, touch input, and/or via voice input.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

In this manner, the exemplary embodiments are provided which enable the user computing device to send content to nearby computing device online or offline based on the proximity of the other devices to the user computing device. It should be noted that various modifications and changes may be made without departing from the spirit and scope of the present invention. Consequently, these and other modifications are contemplated to be within the spirit and scope of the following claims. As various changes could be made in the above constructions, products, and methods without departing from the scope of aspects of the disclosure, it is intended that the matter contained in the above description and shown in the accompanying drawings shall be interpreted as illustrative and not in a limiting sense.

What is claimed is:

1. A method of instant messaging, the method comprising:
   receiving an input from a user of a first computing device for sending a message to a second computing device;
   in response to the received input from the user, automatically scanning a list stored on the first computing device to identify a MAC address associated with an identity of the second computing device from the list;
   determining, by the first computing device, a proximity of the second computing device to the first computing device based on the MAC address identified by the scanning the list; and
   sending the message to the second computing device using one of two different modes of communication based on and after the determination.

2. The method of claim 1, wherein the MAC address of the second computing device is associated with the identity of the second computing device in the list based on receiving an approval from the second computing device and when the second computing device is nearby the user of first computing device.

3. The method of claim 1, wherein two different modes of communication comprise a first mode of communication and a second mode of communication, wherein the first mode of communication is an offline mode that enables communication without using internet or Wifi Hotspot and the second mode of communication is an online mode that enables communication using the internet.

4. The method of claim 3, further comprising:
   sending a request using the first mode of communication to establish a connection on determining at the first computing device that the second computing device is in proximity to the first computing device;
   receiving a response of the request within a predefined interval of time; and
   sending the message to the second computing device using the first mode of communication based on the response.

5. The method of claim 4, further comprising:
   sending the message to a third computing device for sending the message to the second computing device using a second mode of communication when the response from the second computing device is not received within the predefined interval of time.

6. The method of claim 3, wherein the first mode of communication is a preferred mode over the second mode of communication based on a user preference.

7. The method of claim 3, wherein the second mode of the communication is used based on a determination that the message cannot be sent using the first mode of communication.

8. The method of claim 3, wherein the first mode of communication is switched to the second mode of communication or the second mode of communication is switched to the first mode of communication based on an update in the determination of the proximity of the second computing device.

9. The method of claim 1, wherein the first computing device receives a verification from a server that an application for sending the message and a mobile number associated with the first computing device are configured on the first computing device.

10. A system for instant messaging, the system comprising:
    a memory associated with a first computing device, said memory area storing a plurality of instructions;
    a processor programmed to execute the instructions stored in the memory to:
      receive an input, at the first computing device by a user of the first computing device, for sending a message to a second computing device;
      in response to the received input, automatically scan a list on the first computing device to identify an identifier associated with the second computing device;
      determine after the scanning, at the first computing device, a proximity of the second computing device to the first computing device using the identified identifier; and
      send the message to the second computing device based on the identification and the determination.

11. The system of claim 10, wherein the message is sent by WI-FI direct service/Bluetooth/WIFI without using internet.

12. The system of claim 10, wherein a profile of the user associated with the first computing device is stored on the first computing device and different visual indications are displayed on a map on the first computing device based on similarity of profiles of available users with the profile of the user associated with the first computing device.

13. The system of claim 12, wherein the user associated with the first computing device is allowed to select one of the available users based on the similarity being higher than a predefined threshold value.

14. The system of claim 10, wherein the user associated with the first computing device is notified when one of the available users is nearby and has similarity higher than a predefined threshold value.

15. The system of claim 10, wherein the processor programmed to further execute the instructions stored in the memory to:

broadcast, without using internet, name and dynamic interests associated with the user of the first computing device without disclosing personal information and without getting connected to any other nearby device.

16. The system of claim 10, wherein the message is sent from the first computing device to the second computing device via one or more intermediate nodes using MAC address of the one or more intermediate nodes and an offline mode without using internet, wherein the MAC address of the one or more intermediate nodes is bound in the list and is different from the MAC address of the first computing device and the second computing device.

17. The system of claim 10, wherein the first computing device receives an authentication that a mobile app and a mobile number are configured on the first computing device in response to a request from the first computing device, wherein the request includes the list and a response to the request includes MAC address of the first computing device.

18. The system of claim 10, wherein the memory stores a binding table in which one or more mobile numbers in a contact list on the first computing device are binded with MAC addresses, wherein the binding table enables automatic switching of a first mode of sending the message to a second mode of sending the message, wherein the first mode is an offline mode and the second mode is an online mode, wherein both modes are used concurrently for sending messages.

19. A computer-readable medium comprising executable instructions to enable instant messaging, the instructions being executable to:

broadcast periodically name and dynamic interests of a user associated with a computing device to one or more nearby available computing devices without disclosing personal information of the user and without getting connected to internet, wherein the name and dynamic interests are broadcasted based on renaming of MAC address of the computing device;

receive a notification from one of the one or more nearby available computing devices based on matching of the dynamic interests of the user associated with the computing device with interests of the one of the one or more nearby available computing devices, wherein notification are received when the matching is more than a predefined value;

send a request, without getting connected to the internet, to establish an offline connection with the one of the one or more available nearby computing devices after receiving the notification from the one of the one or more nearby available computing devices;

receive an acceptance of the request, without getting connected to the internet, from the one of the one or more nearby available computing devices; and in response to receiving the acceptance, send one or more messages to the one of the one or more nearby available computing devices using an offline mode.

20. The computer-readable medium of claim 19, wherein the name and the dynamic interests are associated with the MAC address of the computing device.

* * * * *